C. C. GATES.
BELT MAKING PROCESS.
APPLICATION FILED SEPT. 27, 1917.

1,281,153.

Patented Oct. 8, 1918.
3 SHEETS—SHEET 1.

C. C. Gates.
Inventor

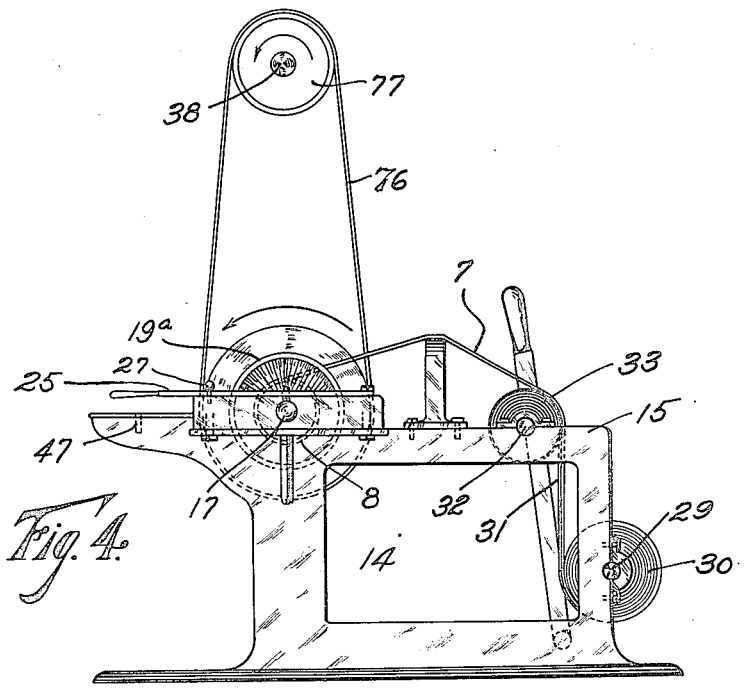
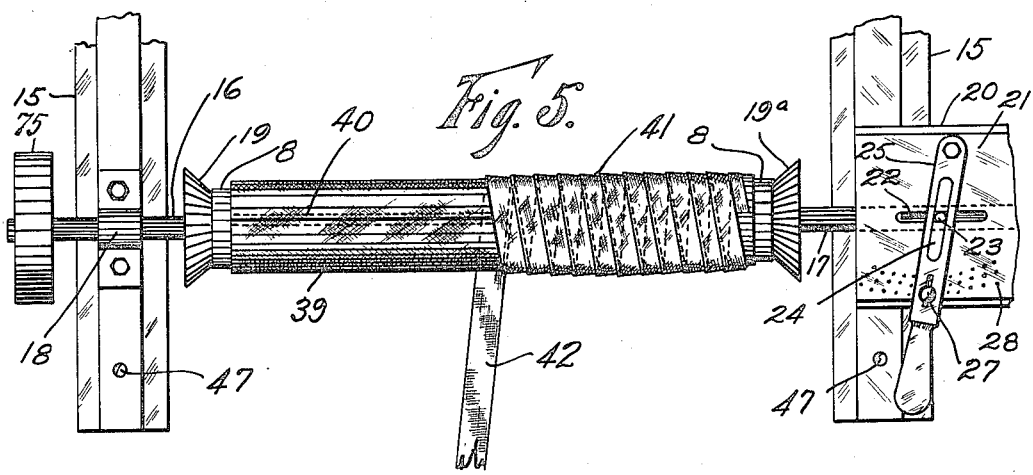

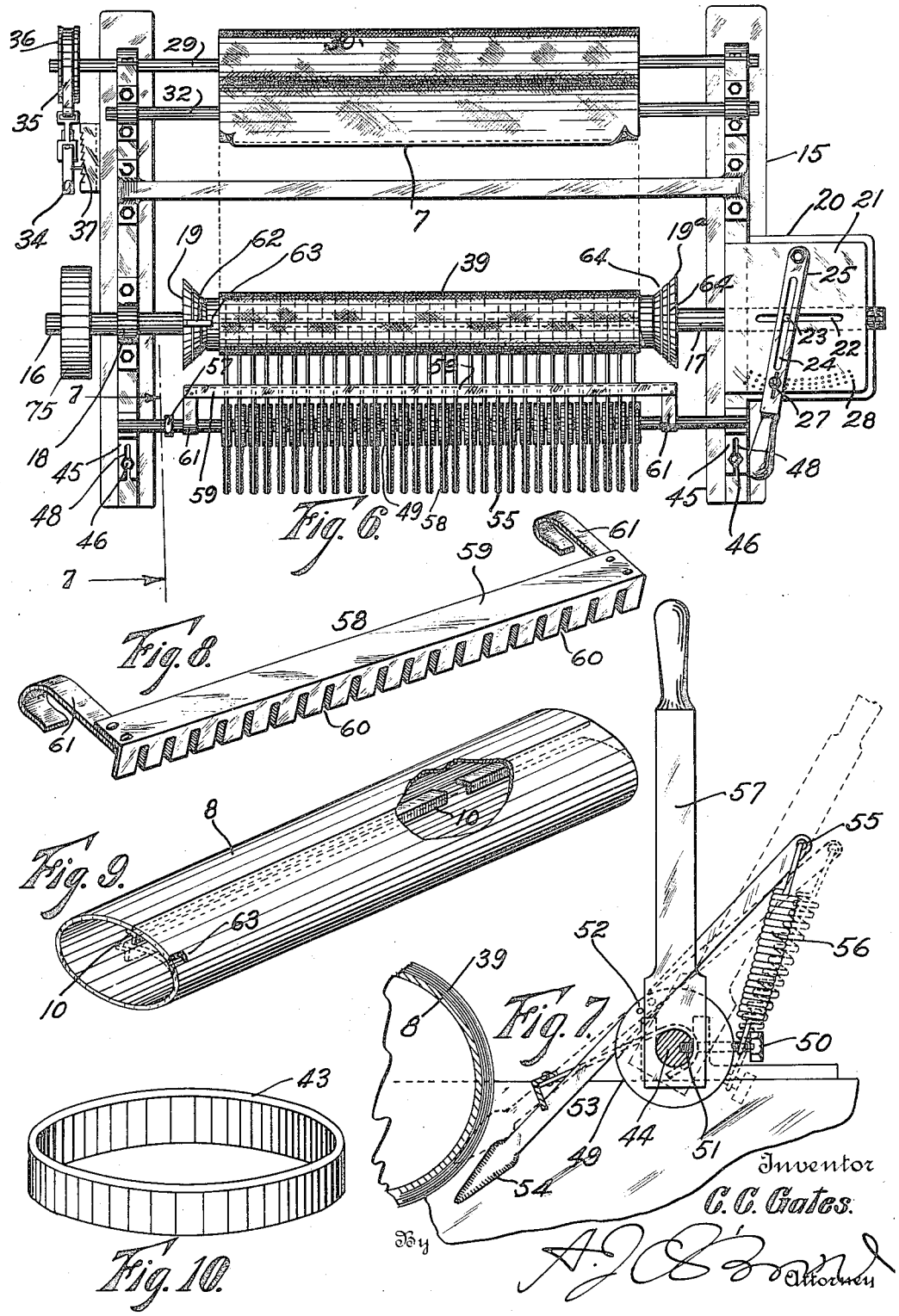

UNITED STATES PATENT OFFICE.

CHARLES C. GATES, OF DENVER, COLORADO, ASSIGNOR TO THE INTERNATIONAL RUBBER COMPANY.

BELT-MAKING PROCESS.

REISSUED

1,281,153.  Specification of Letters Patent.  Patented Oct. 8, 1918.

Application filed September 27, 1917. Serial No. 193,526.

*To all whom it may concern:*

Be it known that I, CHARLES C. GATES, a citizen of the United States, residing at the city and county of Denver and State of Colorado, have invented certain new and useful Improvements in Belt-Making Processes; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a process for making belts, more especially adapted for use in connection with automobiles for operating the fans employed in connection with the engines of these machines. It is evident, however, that belts made by this process may be employed in all other relations where high efficiency and durability are required.

My improved process is utilized to produce a belt in annular form, whereby when completed there is no abnormal tension upon the fibers or threads of the outer portion of the belt due to bending a flat belt member into annular form and connecting the extremities of the flat member in the usual or ordinary way. This belt is composed of layers of rubberized woven fabric applied to one another by a winding operation, a cylindrical core being employed for the purpose. The extremities of the sheet of fabric are secured by raw vulcanizable material so that when the belt member is vulcanized, an integral or homogeneous annular endless belt structure is produced. In forming the belts I prefer to make a relatively long cylindrical belt member and after vulcanization cut this member into relatively narrow belts of predetermined size, after which the belts are removed from the core.

An important feature of the process consists in employing a rubberized woven fabric so cut that the warp and woof thereof extend diagonally to the length of the sheet, whereby the belt has a limited degree of elasticity, which is important, and I might say essential in a belt of this character; whereas, when the warp and woof are arranged in the normal way so that the threads of one of these parts extend parallel to the length of the belt, practically no stretch or elasticity is allowed since the threads are non-elastic.

Hence, the process consists first in cutting strips of the proper width from woven rubberized fabric in such a manner that the warp and woof extend diagonally of or form oblique angles with the length of the sheet of fabric. It is ordinarily necessary to cut a series of strips from a sheet of the rubberized fabric, the cuts extending diagonally to the direction of the length of the normal sheet, and afterward connecting these strips to form a relatively long sheet whose warp and woof are diagonally arranged to the direction of the length of the sheet. This sheet is first wound into a roll of convenient size and upon a shaft or drum from which it can be conveniently unwound for belt forming purposes. The core upon which the belt is formed is preferably composed of a hollow collapsible cylinder which is mounted in a lathe or other structure whereby it may be rotated in order to form the relatively long cylindrical belt member. Assuming that the cylindrical core is in place, one end of the sheet of rubberized fabric whose warp and woof are diagonal to the direction of its length, is applied to the cylinder through the medium of a strip of raw gum or other suitable vulcanizable material, the end edge of the sheet covering only a part of the strip of gum. The cylindrical cone is then rotated, and after the first convolution is completed it will be understood the rubberized fabric adjacent the starting edge also engages a portion of the gum, thus completely sealing the first convolution after vulcanization is complete. The rotation of the cylinder is continued until the desired number of layers or thicknesses of the rubberized fabric are arranged in superposed relation to produce a belt of the proper thickness. The sheet of fabric is then severed and another strip of raw gum or vulcanizable material applied to the outer edge of the sheet of fabric and allowed to overlap the adjacent body portion of the belt member. The cylindrical core with its belt member thereon is then tightly covered exteriorly by winding thereon a layer of suitable canvas which forms a covering for the cylindrical belt member. The cylindrical core is then removed from the lathe or means for imparting the rotary movement, and placed within the vulcanizer where it is left the required length of time to properly cure or vulcanize the said member. The core with its belt member is then removed from the vulcanizer and placed in the same or another lathe, after which the canvas covering is removed therefrom by an unwinding operation. The belt member is then cut into a series of belts of the desired width, through the instrumentality of suitable cutting mechanism, which will be hereinafter described more in detail. After this is done the cylindrical core and the belts carried thereby are removed from the lathe and the core collapsed, after which the belts will slip therefrom in an endwise direction. While the process is not limited to any particular mechanical structure for practising the same, I have illustrated in the accompanying drawing suitable apparatus for the purpose, described and claimed in my co-pending application Serial No. 193,525, filed September 27, 1917. In this drawing:

Fig. 4 is an end elevation of the structure shown in Fig. 3, the same being a view looking in the direction of arrow 4 in this view.

Fig. 5 is a top plan view of a lathe or winding member illustrating the cylindrical core with its belt member thereon, and further showing the manner of applying the canvas covering to the belt member prior to placing the same in the vulcanizer.

Fig. 6 is a top plan view of the complete apparatus including the mechanism for cutting the cylindrical belt member into a series of belts of predetermined width.

Fig. 7 is a section taken on the line 7—7 Fig. 6 looking toward the right, the parts being shown on a larger scale.

Fig. 8 is a perspective view of a gage forming a part of the apparatus illustrated in Fig. 6.

Fig. 9 is a perspective detail view partly broken away, of the collapsible cylindrical core employed.

Fig. 10 is a perspective view of one of the completed belts.

The same reference characters indicate the same parts in all the views.

Figure 1:
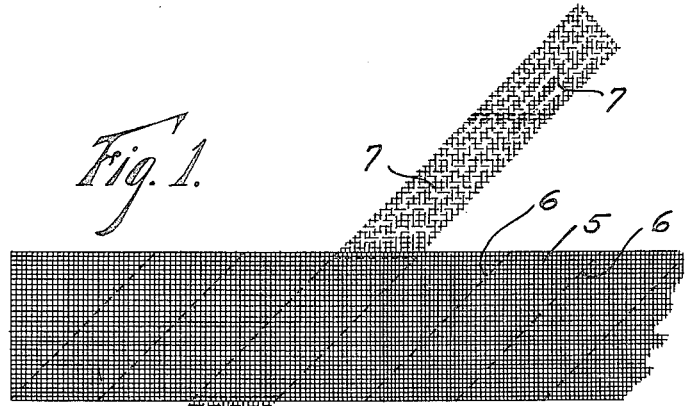
Figure 1 is a top plan view of a sheet of rubberized fabric illustrating the manner of cutting strips therefrom in order to form a sheet of material adapted for use in carrying out my belt-making process.
Figure 2:
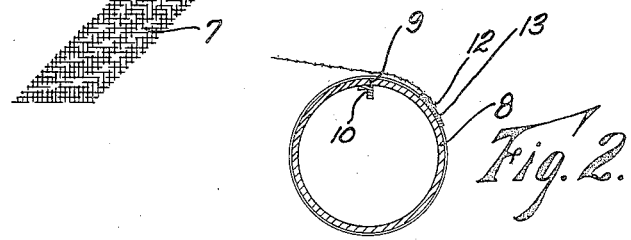
Fig. 2 is a cross section of a collapsible cylindrical core showing the manner of starting the operation of winding the rubberized fabric thereon for belt forming purposes.
Figure 3:
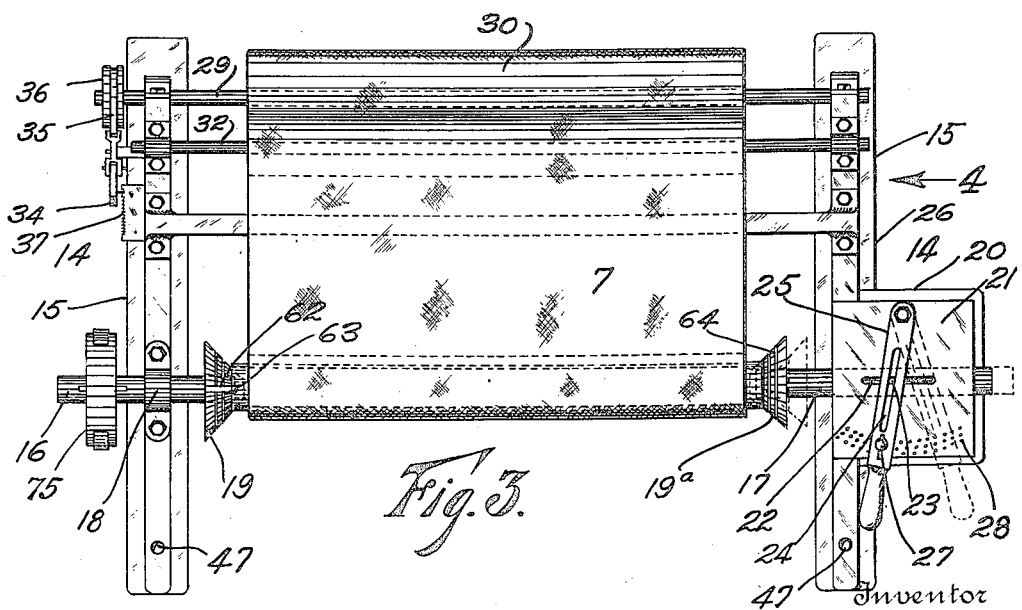
Fig. 3 is a top plan view of a suitable apparatus for rotating the cylindrical core and winding the fabric thereon, the same being unwound from a roll of the said fabric.

Let the numeral 5 designate a relatively wide sheet of rubberized fabric whose length coincides with one of the threads as the warp of the woven sheet. The dotted lines 6 of this sheet indicate the lines upon which the sheet may be severed to form a sheet 7 of the fabric in which the warp and woof extend diagonally to the length of the sheet. The sheet 7 after it is completed is applied to a core 8 which as illustrated in the drawing consists of a cylinder which is divided as shown at 9 on a line parallel with its axis, one edge thereof having secured thereto an angle bar 10 which slightly overlaps the division line when the core is expanded, whereby the device is locked in the expanded position. In applying the sheet 7 thereto, one of the end edges thereof is placed upon a strip 13 of raw gum which extends the length of the cylinder. This cylinder is placed in a lathe structure, which as illustrated in the drawing is composed of a frame work 14 including two end members 15, in which are mounted short shafts 16 and 17. The shaft 16 is journaled in a box 18 and to its inner extremity is applied a cone shaped head 19 adapted to fit into one end of the cylindrical core 8. The other shaft 17 is mounted in an extension 20 of the adjacent frame member 15, and is covered by a plate 21 having a slot 22 through which projects upwardly a pin 23 which passes through a slot 24 formed in a shifting lever 25, said lever being fulcrumed as shown at 26, and carrying a pin 27 adapted to enter any one of a series of perforations 28 formed in the plate 21, for locking the shaft 17 in the desired position of endwise adjustment. This shaft member 17 is lengthwise movable in its bearing, in order to facilitate the mounting and demounting of the cylindrical core 8. Also mounted on the frame members 15 of this structure is a shaft or drum 29 upon which is mounted a roll 30 of rubberized fabric composed of convoluted layers of the sheet 7. This sheet 7 of rubberized fabric when wound upon the shaft 29 is accompanied by a layer of canvas which is arranged between the convolutions of the rubberized sheet to prevent these convolutions from adhering. This canvas or separating fabric is designated by the numeral 31, and as the sheet 7 is unwound from the roll 30, the sheet 31 is taken off and wound upon a shaft 32 to form a roll 33, which is best illustrated in Fig. 4. Suitable tension or resistance is placed on the shaft 29 through the instrumentality of a brake lever 34 suitably connected with a brake band 35 engaging a brake drum or wheel 36. A suitable ratchet plate 37 is employed for locking the lever 34 in the desired position of adjustment. It is important in carrying out the process that sufficient tension or resistance be employed in connection with the shaft 29 in order that a part of the stretch or elasticity due to the diagonal arrangement of the warp and woof of the sheet 7, be eliminated and this is accomplished to the desired or predetermined degree through the instrumentality of the brake mechanism. When the machine illustrated in Figs. 3 and 4 is in operation, the shaft 16 is rotated together with the two conical or frustum shaped heads 19 and 19ᵃ, the head 19ᵃ being journaled on the inner extremity of the shaft 17 and arranged to rotate in unison with the head 19 which is keyed to the shaft 16. Assuming that the end edge of the sheet 7 is applied to the cylindrical core 8 through the medium of the strip 13 of raw gum, the core is rotated by the employment of any suitable power. As illustrated in the drawing, a pulley 75 is keyed to the shaft 16 and is engaged by a belt 76 which also engages a pulley 77 fast on a line shaft or a shaft connected with an suitable motor. The cylindrical core 8 is rotated until a sufficient number of layers of the rubberized sheet 7 are formed or applied thereto to produce a cylindrical belt member of the desired thickness. The sheet 7 is then cut as illustrated in Fig. 6, after which the free edge of the sheet 7 connected with the cylindrical belt member 39, is fastened to the body of the said member by another strip of raw gum 40, the same being indicated by dotted lines in Fig. 5. This strip of gum overlaps the edge of the fabric 7 and also the adjacent portion of the body of the cylindrical member. A covering 41 of suitable canvas or other fabric is then applied to the belt member 39 by winding a strip 42 thereon as indicated in Fig. 5. The belt member thus covered is then removed from the lathe structure together with the cylindrical core, and placed in a vulcanizer until it is properly cured, after which it is returned to the lathe or another one like it (see Fig. 6) and the covering 41 removed. Mechanism is then applied to the frame work 14 for cutting the belt member into a series of belts 43 of the desired width. This cutting mechanism consists of a rock shaft 44 which is journaled in movable plates 45 mounted on the forward end extension of the frame members 15, the said bearing plates being held in place by set bolts 47 formed in the members 15, the bearing plates being adjustable by reason of the fact that the bolts pass through slots 48 formed in the bearing plates. The disks 49 are mounted on the rock shaft 44 and are movable lengthwise thereof, each disk being connected with the rock shaft by means of a bolt 50 which passes through a threaded perforation in the disk and enters a groove 51 in the rock shaft which is continuous, whereby the disks are endwise adjustable on the shaft. Fulcrumed on each of these disks as shown at 52 is a lever-like handle 53, one extremity of which is equipped with a knife 54, while to the opposite extremity beyond the fulcrum is connected as shown at 55 the upper extremity of a spiral spring 56, whose lower extremity is connected with the corresponding set bolt 50. A manipulating lever arm 57 is secured at its lower extremity to the rock shaft so that as the lever is adjusted or thrown from the full line position in Fig. 7 to the dotted line position, the outer extremities of the knife handles 53 will be lowered while their inner or knife blade extremities will be thrown into engagement with the cylindrical belt member 39 for cutting purposes. It should be explained, however, that a gage 58 consisting of a bar 59 having recesses 60 equidistantly spaced, is connected with the rock shaft 44 by means of two hooks 61. The lower portions of the knife handles 53 are made to engage the recesses 60 which are properly spaced to determine the width of the belts 43. Then as the lever arm 57 is properly adjusted and the knife blade extremities 54 thereof are thrown into engagement with the cylindrical belt member 39 as the latter is rotated, the belt member is cut into a series of belts of the desired width. The core with the belt structure thereon is then removed from the lathe, after which the cylindrical core is collapsed by springing its free edge past the angle bar 10 and then moving it inwardly to the dotted line position in Fig. 9 after which the belts 43 in their completed form will slip from the core when the latter is properly tilted. It should perhaps be explained that the conical head 19 of the lathe structure is equipped with a key 62 which engages a recess 63 formed in the cylindrical core 8, whereby the core is caused to rotate with the head 19 and its shaft 16. The friction between the head 19ᵃ and the adjacent extremity of the cylindrical core is sufficient to cause the two parts to rotate in unison when shaft 16 and the core 19 are rotated.

The cutting mechanism is adjustable toward and away from the cylindrical belt member in order to compensate for variation in the diameter of the belt members. It will be understood that the longer the required belt the larger the cylindrical core for use in forming the belt, will be. Hence, the heads 19 and 19ᵃ are provided with properly spaced circumferential grooves 64 adapted to engage the extremities of cylinders of varying diameter. The cylinders when in collapsed form may be placed in engagement with these heads, then as the shaft member 17 is adjusted in the endwise direction, the heads will cause the cylindrical core to expand until it engages the proper groove 64, which forms a stop against further adjustment.

Having thus described my invention, what I claim is:

1. The herein described belt making process, consisting in cutting rubberized woven fabric to form a sheet whose warp and woof are arranged diagonal to its length, winding the sheet on a core in the direction of its length to form an annular belt member composed of superposed layers of such fabric, and finally vulcanizing the belt member while supported on the core.

2. The herein described belt making process consisting in cutting woven rubberized fabric to form a sheet whose warp and woof form oblique angles to its length, winding the said sheet in the direction of its length on a core to form an annular belt member consisting of superposed layers of such fabric, the ends of the sheet being secured to the body of the belt member by raw vulcanizable material, and finally vlucanizing the belt member while in position on the core, whereby it is held in annular form until cured.

3. The herein described belt making process consisting in cutting woven rubberized fabric to form a sheet whose warp and woof are arranged diagonal to its length, winding the sheet on a core in the direction of its length to form an annular belt member consisting of superposed layers of such fabric, vulcanizing the belt member while in position on the core and finally cutting the annular belt member to form a number of relatively narrow belts.

4. The herein described belt making process consisting in taking a sheet of woven fabric whose warp and woof form oblique angles to its length, winding the said sheet in the direction of its length on a core to form an annular belt member consisting of superposed layers of such fabric, the ends of the sheet being secured to the body of the belt member by raw vulcanizable material, vulcanizing the belt member while in position on the core, whereby it is held in annular form until cured, and finally subdividing the belt member to form a series of belts of the equal length.

5. The herein described belt making process consisting in taking woven rubberized fabric whose warp and woof form oblique angles to its length, winding the said sheet in the direction of its length on a core to form an annular, endless belt member consisting of superposed layers of such fabric, the said fabric being placed under tension during the winding operation to eliminate superfluous elasticity, the ends of the sheet being secured to the body of the belt member by raw vulcanizable material, and finally vulcanizing the belt member while in position on the core, whereby it is maintained in annular form until cured.

6. The herein described belt making process consisting in taking a sheet of woven rubberized fabric whose warp and woof form oblique angles to its length, winding the said sheet in the direction of its length on a core to form an annular belt member composed of superposed layers of such fabric, the end edges of the sheet being secured to the body of the belt member by raw vulcanizable material, covering the belt member with a non-vulcanizable fabric, and finally vulcanizing the belt member while in position on the core.

7. The herein described belt making process, consisting in cutting woven rubberized fabric to form pieces whose warp and woof extend at oblique angles to its length, connecting the said pieces to form a relatively long sheet of such material, winding the said sheet in the direction of its length on a core to form an annular belt member consisting of superposed layers of such fabric, the ends of the sheet being secured to the body of the belt member by vulcanizable material, covering the belt member with a non-vulcanizable fabric, vulcanizing the belt member while in position on the core, and finally removing the said covering.

8. The herein described belt making process consisting in cutting rubberized woven fabric to form pieces whose warp and woof form oblique angles to their length, connecting the said pieces to form a relatively long sheet of such fabric, winding the said sheet in the direction of its length to form an annular belt member composed of superposed layers of such fabric, the said fabric being placed under tension during the winding operation to eliminate superfluous elasticity, the ends of the sheet being secured to the body of the belt member by raw vulcanizable material, vulcanizing the belt member while in position on the core, and finally subdividing the belt member to form a series of belts of uniform length.

9. The herein described belt making process comprising winding a sheet of woven fabric treated with a vulcanizable compound and whose warp and woof are oblique to its length, upon a core in the direction of the length of the fabric to form an annular belt member comprising superposed layers of such fabric, and vulcanizing the belt member while supported upon the core.

In testimony whereof I affix my signature.

CHARLES C. GATES.